US011147204B2

(12) United States Patent
Stanhope et al.

(10) Patent No.: US 11,147,204 B2
(45) Date of Patent: Oct. 19, 2021

(54) SYSTEM AND RELATED METHODS FOR ADJUSTING A DOWN FORCE APPLIED TO A ROW UNIT OF AN AGRICULTURAL IMPLEMENT

(71) Applicant: CNH Industrial America LLC, New Holland, PA (US)

(72) Inventors: Trevor Stanhope, Darien, IL (US); Darian E. Landolt, Evanston, IL (US); Jason T. Czapka, Munster, IN (US)

(73) Assignee: CNH Industrial America LLC, New Holland, PA (US)

( * ) Notice: Subject to any disclaimer, the term of this patent is extended or adjusted under 35 U.S.C. 154(b) by 602 days.

(21) Appl. No.: 16/057,110

(22) Filed: Aug. 7, 2018

(65) Prior Publication Data

US 2020/0045869 A1   Feb. 13, 2020

(51) Int. Cl.
| | | |
|---|---|---|
| *A01B 63/32* | (2006.01) | |
| *A01C 5/06* | (2006.01) | |
| *A01B 76/00* | (2006.01) | |
| *A01C 7/20* | (2006.01) | |

(52) U.S. Cl.
CPC ............. *A01B 63/32* (2013.01); *A01B 76/00* (2013.01); *A01C 5/064* (2013.01); *A01C 7/205* (2013.01)

(58) Field of Classification Search
CPC ......... A01C 7/205; A01C 5/064; A01B 63/32; A01B 79/005; A01B 76/00
See application file for complete search history.

(56) References Cited

U.S. PATENT DOCUMENTS

| | | | |
|---|---|---|---|
| 5,524,560 A | 6/1996 | Carter | |
| 8,078,367 B2* | 12/2011 | Sauder | G06Q 40/12 |
| | | | 701/50 |
| 8,862,339 B2* | 10/2014 | Henry | A01C 5/062 |
| | | | 701/50 |
| 9,265,192 B2 | 2/2016 | Chan et al. | |
| 9,516,802 B2 | 12/2016 | Zemenchik | |
| 9,585,301 B1 | 3/2017 | Lund et al. | |
| 9,629,304 B2 | 4/2017 | Zielke | |
| 9,675,004 B2 | 6/2017 | Landphair et al. | |
| 9,686,901 B2 | 6/2017 | Achen et al. | |
| 9,717,178 B1 | 8/2017 | Sander et al. | |
| 9,801,332 B2 | 10/2017 | Landphair et al. | |
| 9,814,172 B2* | 11/2017 | Achen | A01C 7/205 |

(Continued)

FOREIGN PATENT DOCUMENTS

| | | |
|---|---|---|
| CN | 206302722 U | 7/2017 |
| JP | H02222604 A | 9/2005 |

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

In one aspect, a method for adjusting the down force applied to a row unit of an implement during the performance of a planting operation within a field may include receiving, by a computing device, soil composition data associated with a soil composition of soil within the field and determining a moisture content of the soil within the field. The method may also include calculating a soil plasticity factor associated with the soil within the field based on the soil composition data and the moisture content of the soil and adjusting a down force applied to at least one row unit of the implement based on the soil plasticity factor.

19 Claims, 4 Drawing Sheets

(56) References Cited

U.S. PATENT DOCUMENTS

| | | | |
|---|---|---|---|
| 9,968,030 B2* | 5/2018 | Kowalchuk | A01C 7/205 |
| 10,188,027 B2* | 1/2019 | Hahn | A01C 5/068 |
| 2014/0379228 A1 | 12/2014 | Batcheller et al. | |
| 2016/0037709 A1 | 2/2016 | Sauder et al. | |
| 2016/0338260 A1 | 11/2016 | Hahn et al. | |
| 2017/0094889 A1 | 4/2017 | Garner et al. | |
| 2017/0094894 A1 | 4/2017 | Heim et al. | |
| 2018/0128933 A1* | 5/2018 | Koch | A01C 7/205 |
| 2019/0373797 A1* | 12/2019 | Schoeny | A01C 7/203 |
| 2019/0373801 A1* | 12/2019 | Schoeny | A01B 79/005 |
| 2020/0060068 A1* | 2/2020 | Stanhope | G01L 5/0052 |

\* cited by examiner

SYSTEM AND RELATED METHODS FOR ADJUSTING A DOWN FORCE APPLIED TO A ROW UNIT OF AN AGRICULTURAL IMPLEMENT

FIELD

The present disclosure generally relates to planting implements, and more particularly, to systems and methods for adjusting a down force applied to a row unit of a planting implement, such as a planter or seeder.

BACKGROUND

Some planting implements are configured to plant crops by depositing seeds at a desired planting depth during an agricultural operation. For example, planters are generally towed behind a tractor or other work vehicle. Planters generally include a plurality of row units, and each row unit is configured to form a seeding path. Each row unit can include one or more gauge wheels and a ground opening tool. As the implement moves across the field, the ground opening tool opens a trench, and the row unit deposits seeds into the trench. The gauge wheel can be positioned a vertical distance relative to the ground opening tool to establish a desired depth of the trench and the associated planting depth. Maintaining a constant trench depth provides a substantially uniform planting depth, which enhances crop yields.

Surface irregularities or unevenness of the ground surface may cause the row units to bounce as the implement is moved across the field, which may result in inconsistencies in the planting depth. Large down forces may be applied to the row unit to maintain contact with the ground and thus provide a consistent planting depth. Providing too great of a down force to the row unit, however, may compact the soil and adversely affect crop growth.

Accordingly, an improved method and related system for adjusting the down force applied to a row unit of an implement that addresses one or more of the issues identified above would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a method for adjusting the down force applied to a row unit of an implement during the performance of a planting operation within a field. The method may include receiving, by a computing device, soil composition data associated with a soil composition of soil within the field and determining, by the computing device, a moisture content of the soil within the field. The method may also include calculating, by the computing device, a soil plasticity factor associated with the soil within the field based on the soil composition data and the moisture content of the soil and adjusting, by the computing device, a down force applied to at least one row unit of the implement based on the soil plasticity factor.

In another aspect, the present subject matter is directed to a system for adjusting a down force applied to a row unit of an implement. The system may include a load sensor configured to sense the down force applied to the row unit and a controller communicatively coupled to the load sensor. The controller may include a processor and associated memory, and the memory may store instructions that, when executed by the processor, configure the controller to perform operations. The operations may include receiving soil composition data associated with a soil composition of soil within the field and determining a moisture content of the soil within the field. The operations may also include calculating a soil plasticity factor associated with the soil within the field based on the soil composition data and the moisture content of the soil and adjusting the down force applied to the row unit based on the soil plasticity factor.

In a further aspect, the present subject matter is directed to a method for adjusting a down force applied to a row unit of an implement. The method may include receiving, by a computing device, soil composition data that comprises information about a proportional content of at least one of sand, silt, clay, mineral content, or organic matter. The method may also include calculating, by the computing device, at least one of a down force limit or a down force target based on the soil composition data and reducing, by the computing device, the down force applied to the row unit when the down force exceeds a predetermined threshold with respect to the down force limit or the down force target.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
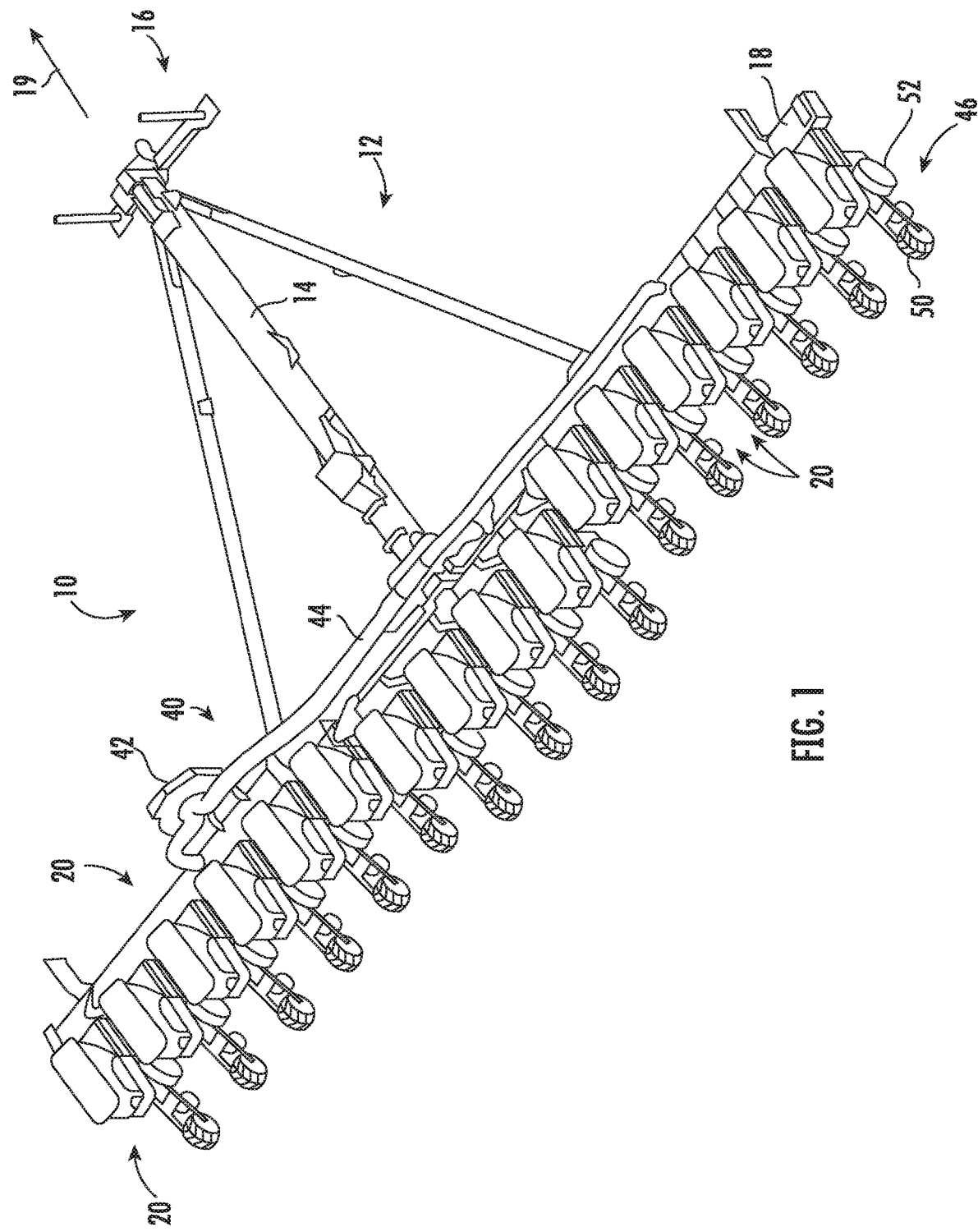
FIG. 1 illustrates a perspective view of one embodiment of an implement according to aspects of the present disclosure.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In general, the present subject matter is directed to systems and related methods for adjusting a down force applied to a row unit of an implement during the performance of a planting operation within a field. More specifically, the down force may be adjusted based on a soil plasticity factor, which may describe a compaction or plasticity characteristic of the soil within the field. The soil plasticity factor may be calculated based, at least in part, on soil composition data, such as information about the proportional content of one or more constituents of the soil. For example, the soil composition data may include the proportional content of at least one of sand, silt, clay, mineral content, or organic matter contained within the soil. The soil plasticity factor may also be calculated based, at least in part, on, a moisture content of the soil. The soil composition data may be determined, for example, by referencing a map that correlates information about the soil with a current location of the implement. Alternatively, soil composition data may be determined by sensing information about the soil using a soil composition sensor. Similarly, the moisture content of the soil may be either sensed using a sensor or determined by referencing a map that correlates moisture content information about the soil with a current location of the implement.

The presently disclosed method and system may prevent or reduce soil compaction while also allowing sufficient down force to be applied to the row unit(s). The down force may be adjusted or controlled in a manner that provides a generally consistent planting depth, yet prevents or reduces compaction. For example, a sufficiently large down force may be applied to the row unit(s) such that contact is generally maintained between the row unit(s) and the soil surface. However, the down force may not be so great that it undesirably compacts the soil.

The down force may be adjusted based, at least in part, on a soil plasticity factor, which may describe a compaction characteristic and/or plasticity characteristic of the soil. For example, in some embodiments, a down force limit or down force target may be calculated based on the moisture content of the soil and the soil plasticity factor. The applied down force may be reduced when it exceeds a predetermined threshold with respect to the down force limit or the down force target. In some embodiments, as the implement is moved through the field, the plasticity factor may be updated based on changes in the moisture content and/or soil composition within the field. As a result, the down force limit and/or down force target may also be adjusted in a manner that prevents or reduces soil compaction, yet still allows sufficient down force to be applied to the row unit to produce a generally consistent planting depth.

FIG. 1 illustrates a perspective view of an agricultural implement 10. The agricultural implement 10 may generally be configured to be pulled by a work vehicle, such as a tractor. It should be appreciated that, although the implement 10 illustrated herein corresponds to a planter, the implement 10 may generally correspond to any suitable equipment or implement, such as seeder (e.g., seed disk drill, seed hoe drill) or another seed dispensing implement, a fertilizer dispensing implement, and/or the like.

The implement 10 may have a frame that includes a tow bar assembly 12. The tow bar assembly 12 may include a tow bar 14 and a connection assembly 16. The connection assembly 16 may be disposed at the longitudinally forward end of the tow bar 14 and may be configured to mate with a corresponding hitch of the work vehicle for pulling the implement 10 through a field to perform an agricultural operation, such as a planting or seeding operation. A toolbar 18 may extend generally transverse to a towing direction 19, in which the implement 10 is towed during performance of the agricultural operation. The tow bar 14 may extend generally parallel with the towing direction 19.

The implement 10 may include a plurality of seed planting row units 20 configured to plant seeds in the soil over which the implement is moved. The row units 20 may be connected to the toolbar 18 and generally evenly spaced apart in a direction perpendicular to the towing direction 19. Any suitable number of row units 20 may be connected to the toolbar 18. For example, 16 row units are connected with the toolbar 18 as illustrated. However, it should be understood that the implement 10 may include greater or fewer row units 20.

Figure 2:
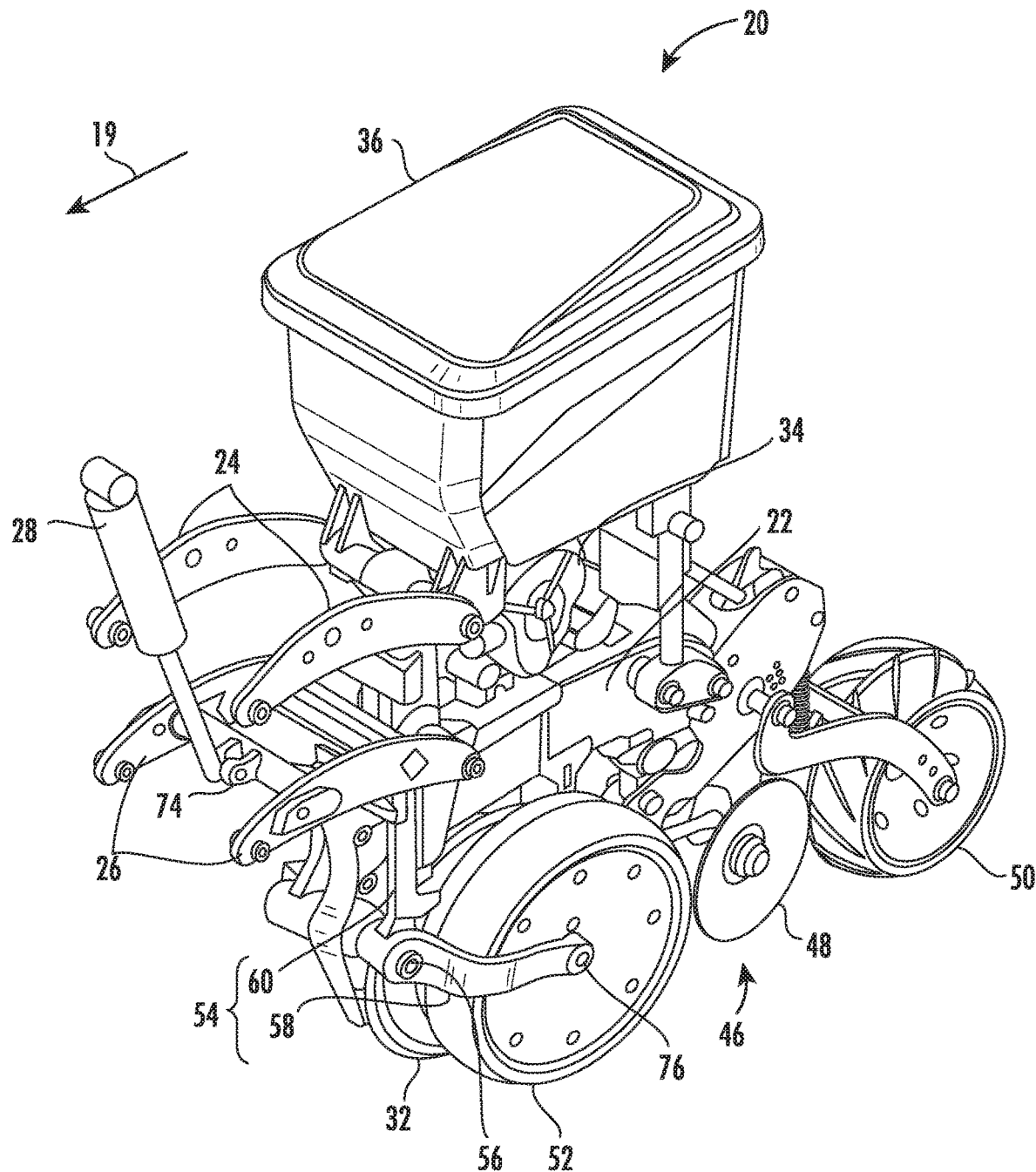
FIG. 2 illustrates an enlarged, partial perspective view of one embodiment of a row unit of the implement shown in FIG. 1 according to aspects of the present disclosure.

Referring to FIG. 2, each row unit 20 may include a frame 22. The frame 22 may be connected to the toolbar 18 (illustrated in FIG. 1). The row unit 20 may include a pair of upper arms 24 and a pair of lower arms 26. The arms 24, 26 may be connected in a parallel configuration to the frame 22 and the toolbar 18 (illustrated in FIG. 1) such that the relative vertical position of the row unit 20 with respect to the toolbar 18 may be adjusted. For example, referring to FIG. 3, in some embodiments the arms 24, 26 may be coupled with a toolbar mount 27 that is mounted to the toolbar 18.

Referring again to FIG. 2, a down force actuator 28 may be configured to apply the down force to the row unit 20. For example, the down force actuator 28 may be connected between the lower arms 26 and the toolbar 18 (illustrated in FIG. 1) or a structure attached to the toolbar 18 (e.g., the toolbar mount 27) such that the down force applied to the row unit 20 may be adjusted by actuating the down force actuator 28. For example, extending the down force actuator 28 may increase the down force, and retracting the down force actuator 28 may decrease the down force. It should be understood that the down force actuator 28 may be connected in any suitable configuration with the row unit 20 for adjusting the down force applied to the row unit 20.

The down force actuator 28 may be selected from a variety of suitable types of actuators. For example, in some embodiments, the down force actuator 28 may be or include a hydraulic actuator, pneumatic actuator, or electro-mechanical actuator.

During a planting operation, each row unit 20 may form a seed trench, deposit equally spaced seeds in the seed trench, and close the seed trench over the deposited seeds. Each row unit 20 may include a pair of opening discs 32. The opening discs 32 may converge forwardly and downwardly to open a furrow or seed trench as the planting implement 10 moves forward. A seed metering system 34 may receive seeds from a seed hopper 36 and provide individual seeds at a controlled rate for deposit in the bottom of the seed trench. A vacuum system 40 (illustrated in FIG. 1) may include a fan 42 and air lines 44. The vacuum system 40 may provide vacuum to the seed metering system 34 to facilitate operation of the seed metering system 34.

The row unit 20 may include a seed trench closing mechanism 46 configured to close the seed trench after the seeds have been deposited in the seed trench. The seed trench closing mechanism 46 may include a pair of pinch wheels or closing discs 48 arranged on opposite sides of the seed trench and configured to move soil back into the seed trench and over the seeds deposited in the bottom of the seed trench. A trailing press wheel 50 may travel along the top of the closed seed trench and firm the soil replaced in the seed trench.

A depth to which opening discs 32 are allowed to penetrate the ground may be controlled by a pair of gauge wheels 52. The gauge wheels 52 may be disposed on each side of the opening disc 32. Each gauge wheel 52 may be rotatably mounted to a gauge wheel linkage 54 that is pivotally connected at a pivotal attachment 56 to the seed planting unit frame 22. Each gauge wheel linkage 54 may include a wheel retention arm 58 extending generally rearward from pivotal attachment 56 and a control arm 60 extending generally upward from the pivotal attachment 56. Pivoting the gauge wheel linkage 54 about the pivotal attachment 56 adjusts the relative height position of the gauge wheel 52.

Figure 3:
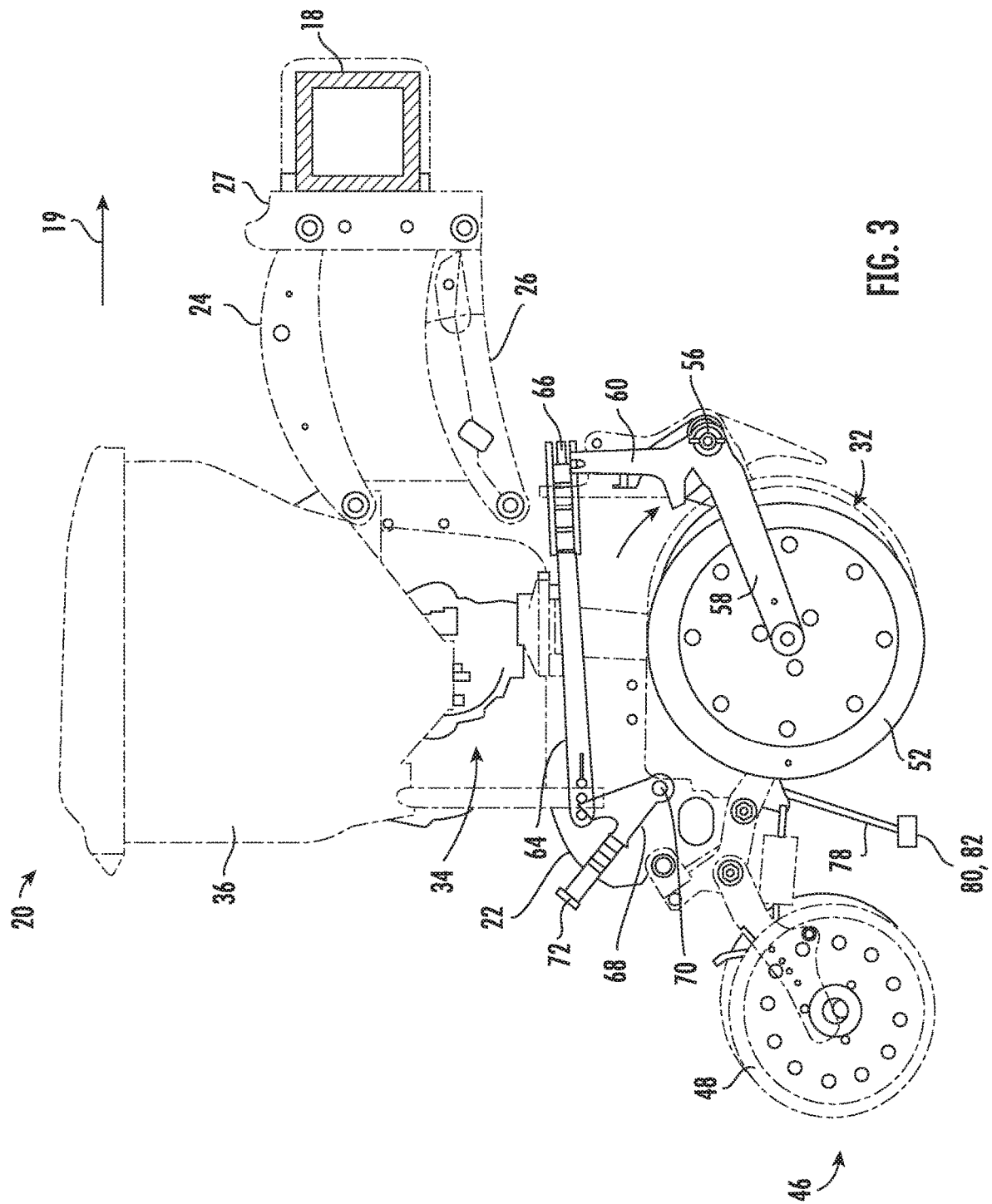
FIG. 3 illustrates a simplified side elevation view of the row unit of FIG. 2 in which portions are omitted or transparent to depict particular components.

FIG. 3 illustrates a simplified side elevation view of the row unit 20 in which portions are omitted or transparent to depict particular components. For example, the trailing wheel press 50 and down force actuator 28 are omitted from FIG. 3. A series of linkages may be configured to pivot the gauge wheel linkage 54 and adjust the relative height position of the gauge wheels 52. For example, a depth control linkage arm 64 may be connected with the control arm 60 of the gauge wheel linkage 54 by a wobble bracket 66. A pivot arm 68 may be pivotally mounted at a pivotal connection 70 and coupled with the depth control linkage arm 64 such that pivoting the pivot arm 68 about the pivotal connection 70 adjusts an axial position of the linkage arm 64, thereby rotating the gauge wheel linkage 54 to raise or lower the gauge wheels 52.

The height of the gauge wheels 52 may determine the penetration depth of the opening discs 32. Raising the gauge wheels 52 may allow the opening discs 32 to penetrate deeper into the ground and thus increase a penetration depth of the discs 32. Conversely, lowering the gauge wheels 52 may reduce the penetration depth. A depth adjustment register may be configured to allow an operator to set the penetration depth. For example, a handle 72 may be connected with the pivot arm 68 such that an operator may adjust the height of the gauge wheels 52 by pivoting the pivot arm 68. The handle 72 may be selectively secured such that the height of the gauge wheels 52 may be locked during performance of the agricultural operation.

A variety of sensors may be disposed on or adjacent the row unit 20. In some embodiments, at least one load sensor may be configured to detect a parameter indicative of the down force applied to the row unit 20. For example, referring to FIG. 2, an actuator load pin 74 may be operatively coupled with the down force actuator 28. The actuator load pin 74 may be configured to measure the force applied by the actuator on the lower arms 26. For example, the actuator load pin 74 may couple the down force actuator 28 to the lower arms 26. Alternatively the actuator load pin 74 may couple the down force actuator 28 to the toolbar 18 (illustrated in FIG. 1) or a structure attached to the toolbar 18 (e.g., the toolbar mount 27).

In some embodiments, a gauge wheel load pin 76 may be operatively coupled with the gauge wheel linkage 54, for example at a rotatable attachment point of the gauge wheels 52. For example, the gauge wheel load pin 76 may connect the gauge wheel 52 with the wheel retention arm 58. The gauge wheel load pin 76 may be configured to measure the load applied on the gauge wheels 52 by the gauge wheel linkage 54.

The load sensor(s) have various other configurations. For example, the load sensor(s) may be disposed at any suitable location with respect to the row unit 20 such that the load sensor(s) are configured to measure a down force applied to the row unit 20. For example, in other embodiments, the load sensor(s) may be operatively coupled with at least one of the opening discs 32, pinch wheels or closing disks 48, upper arms 24, lower arms 26, any pivotal attachment associated therewith, and/or any other suitable component for measuring the down force applied to the row unit 20. In some embodiments, the load sensor(s) may include a strain gauge, such as a Wheatstone bridge configuration, and/or a piezoelectric element that is configured to sense strain associated with at least one of component of the row unit 20. The load sensor(s) may employ any suitable load sensing element, however.

Referring to FIG. 3, in some embodiments, at least one moisture sensor 80 may be configured to sense the moisture content of the soil, for example as described below with reference to FIG. 4. The moisture sensor 80 may be disposed in a variety of locations relative to the row unit 20. For example, in some embodiments, a probe 78 may be coupled with the row unit 20 and extend downward from the row unit 20. The moisture sensor 80 may be mounted on the probe 78 such that the moisture sensor 80 contacts and/or penetrates the soil during the agricultural operation.

In other embodiments, a non-contact moisture sensor may be mounted on or adjacent the row unit 20 such that the non-contact moisture sensor is configured to be proximate the soil without contacting or penetrating the soil. In such embodiments, the non-contact moisture sensor may be disposed on or adjacent to any suitable part or component of the row unit 20, including for example, the gauge wheel linkage 54, any portion of the row unit frame 22, and/or the toolbar 18. In other embodiments, a moisture sensor may be mounted on the work vehicle or a structure attached to the work vehicle.

In some embodiments, at least one soil composition sensor 82 may be configured to sense parameters that are indicative of soil composition data. For example, in some embodiments, the soil composition sensor 82 may be mounted on the probe 78 and may be configured to contact and/or penetrate the soil. In other embodiments, the soil composition sensor 82 may be mounted proximate the soil without contacting or penetrating the soil. For example, at least one soil composition sensor(s) may be disposed on or adjacent to any suitable part or component of the row unit 20, including for example, the gauge wheel linkage 54, any portion of the row unit frame 22, and/or the toolbar 18. In other embodiments, the soil composition sensor(s) may be mounted on the work vehicle or a structure attached to the work vehicle. The soil composition sensor(s) may be configured to sense parameters that are indicative of soil composition data, for example as described below with reference to FIG. 4.

Figure 4:
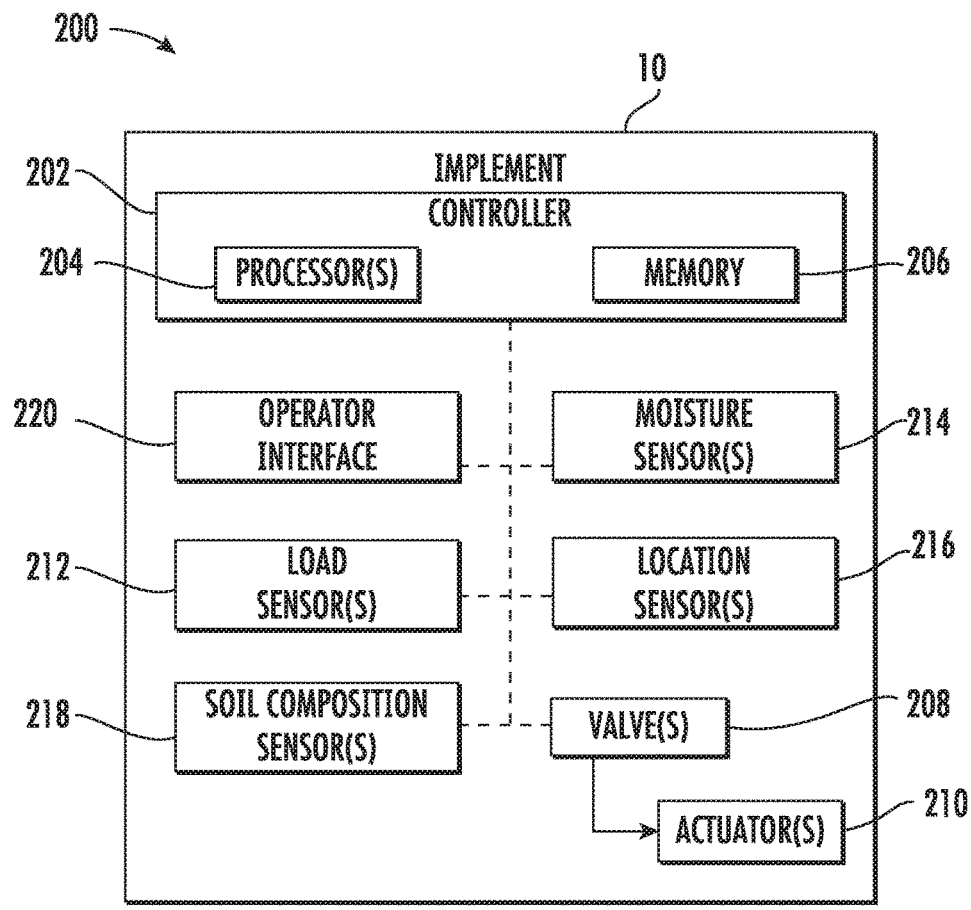
FIG. 4 illustrates a schematic view of one embodiment of a system for adjusting the down force applied to a row unit of an implement.

Referring to FIG. 4, a schematic view of one embodiment of a system 200 for adjusting the down force applied to row units of a planter during the performance of a planting operation within a field is illustrated in accordance with aspects of the present subject matter. In general, the system 200 will be described herein with reference to the implement 10 described above with reference to FIGS. 1 through 3. However, it should be appreciated by those of ordinary skill in the art that the disclosed system 200 may generally be utilized with any suitable planter or other equipment or implement, such as a seeder (e.g., seed disk drill, seed hoe drill) or another seed dispensing implement, a fertilizer dispensing implement, and/or the like.

The system 200 may generally include at least one controller 202 installed on and/or otherwise provided in operative association with the implement 10 and/or work vehicle. In general, the controller 202 of the disclosed system 200 may correspond to any suitable processor-based device(s), such as a computing device or any combination of computing devices. Thus, in several embodiments, the controller 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the controller 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204 configure the controller 202 to perform various computer-implemented functions, such as one or more aspects of a method 300 for adjusting the down force applied to row units of an implement as described below with reference to FIG. 5.

It should be appreciated that the controller 202 may correspond to an existing controller of a work vehicle that is configured to pull the implement 10 and/or a controller on the implement 10 itself. Alternatively, the controller 202 may form all or part of a separate plug-in module that may be installed in association with the work vehicle and/or the implement 10 to allow for the disclosed systems and methods to be implemented without requiring additional software to be uploaded onto existing control devices of the work vehicle or implement 10. In addition, the controller 202 may also include various other suitable components, such as a communications circuit or module, a network interface, one or more input/output channels, a data/control bus and/or the like, to allow the controller 202 to be communicatively coupled with any of the various other system components described herein.

The controller 202 may be configured to adjust the down force applied to row units of an implement during the performance of a planting operation within a field. For example, the controller 202 may be communicatively coupled to one or more control valve(s) 208 configured to regulate the supply of fluid (e.g., hydraulic fluid or air) to one or more corresponding actuator(s) 210. Alternatively, the controller 202 may be configured to regulate a current and/or voltage supply to an electric motor to control the actuator(s) 210, which may include electro-mechanical type actuators. In some embodiments, the actuators 210 may correspond to the down force actuator 28.

The system 200 may include one or more load sensors 212 configured to detect a parameter indicative of the down force applied on the row unit 20. The load sensor(s) 212 may correspond to the load sensor(s) 74, 76 described above with reference to FIG. 2. For example, in some embodiments, the load sensor(s) 212 may correspond to at least one of the actuator load pin 74 or gauge wheel load pin 76.

In several embodiments, the controller 202 may be configured to monitor the current down force being applied to the row unit(s) 20 of the implement 10. Specifically, the controller 202 may be communicatively coupled to the load sensor(s) 212 via a wired or wireless connection to allow measurement signals (e.g., indicated by dashed lines in FIG. 4) to be transmitted from the load sensor(s) 212 to the controller 202. The controller 202 may then be configured to determine or estimate the current down force being applied to the row unit(s) 20 based on the measurement signals received from the load sensor(s) 212. For instance, the controller 202 may include a look-up table or suitable mathematical formula stored within its memory 206 that correlates the sensor measurements to the down force being applied to the row unit(s) 20.

The system 200 may also be configured to determine a moisture content of the soil within the field. For example, in some embodiments the system 200 may include at least one moisture sensor 214. The moisture sensor(s) 214 may correspond to the moisture sensor(s) 80 described above with reference to FIG. 3. The moisture sensor(s) 214 may be configured to detect a parameter indicative of the moisture content of the soil. For example, the moisture sensor(s) 214 may be configured to measure an electrical characteristic, such as the electrical conductivity, resistivity, impedance, and/or dielectric permittivity, of the soil. In some embodiments, the moisture sensor 214 may be configured to measure the moisture content by detecting light (e.g., infrared, near-infra-red light, etc.) emitted by the moisture sensor 214, or a separate device, and at least partially reflected by the soil. The controller 202 may then be configured to determine or estimate the moisture content of the soil based on the measurement signals received from the moisture sensor(s) 214. For instance, the controller 202 may employ a look-up table or suitable mathematical formula stored within its memory 206 that correlates the sensor measurements to the moisture content of the soil.

In some embodiments, the system 200 may include one or more location sensor(s) 216 configured to detect a parameter associated with a geographical or physical location of the implement 10 within the field. For example, in one embodiment, the location sensor(s) 216 may correspond to a GPS receiver configured to detect the GPS coordinates of the implement 10.

In some embodiments, the system 200 may be configured to determine the moisture content of the soil within the field by referencing a moisture map to determine the moisture content for the soil located relative to a current location of the implement 10 within the field. The moisture map may include the moisture content of the soil at a plurality of locations within the field. For example, the controller 202 may determine the current location of the implement using the location sensor(s) 216 and then reference the moisture map to determine the moisture content of the soil proximate the implement.

In some embodiments, the system 200 may be configured to receive soil composition data associated with a soil composition of the soil within the field. For example, in some embodiments the system 200 may reference a soil composition map to determine the soil composition for the soil located relative to the current location of the implement 10 within the field. The soil composition map may include information about the composition of the soil at a plurality of locations within the field. The system 200 may detect a parameter associated with a geographical or physical location of the implement 10 within the field using the location sensor(s) 216.

In some embodiments, the system 200 may be configured to receive the soil composition data by receiving data indicative of at least one constituent of the soil within the field from one or more soil composition sensor(s) 218. The soil composition sensor(s) 218 may correspond to the soil composition sensor(s) 82 described above with reference to FIG. 3. The soil composition sensor(s) 218 may be configured to sense parameters that are indicative of the soil composition data. For example, the soil composition sensor(s) 218 may include contact sensors that are configured to contact the soil, or non-contact sensors that are not configured to contact the soil.

The soil composition sensor(s) 218 may be configured as a variety of suitable sensor types. As examples, the soil composition sensor(s) 218 may be configured as an electromagnetic sensor, electrochemical sensor, mechanical sensor, optical sensor, and/or acoustic or pneumatic sensor. An electromagnetic soil sensor may be configured to sense one or more electrical properties of the soil (e.g., electrical resistance, capacitance, impedance, and the like). The composition of the soil may be determined based on the sensed electrical property (or properties) of the soil. Electrochemical sensors may be configured to sense the acidity (pH level) of the soil using ion-selective electrodes or ion-selective field effect transistors, for example to detect the concentration of ions (e.g., H+, K+, $NO_3$—) within the soil. Mechanical sensors may be configured to measure soil compaction by penetrating the soil as the implement moves across the field. For example, a force applied against the sensor as the sensor is moved through the soil may be sensed and used to determine the mechanical resistance of the soil. Optical sensors may measure the reflectance, absorption, or transmittance characteristics of the soil. For example, ultraviolet and/or infrared light may be omitted, and the optical sensor may sense a characteristic (e.g., magnitude, wavelength, etc.) of the reflected portion of the light. Acoustic sensors may be configured to sense noise generated by the interaction of the soil with the row units 20 and/or any parts of the implement 10 that contacts the soil. Pneumatic sensors may be configured to sense the amount of pressure required to emit a predetermined flow rate of air into the soil at a predetermined depth.

The controller 200 may be configured to estimate or calculate the soil composition of the soil (e.g., the content of at least one of sand, silt, clay, or organic matter contained within the soil) based on the signals received from the soil composition sensor(s) 218. Examples of types of soil composition information that may be received from the soil composition sensors are discussed below with reference to FIG. 5.

The controller 202 may be communicatively coupled to an operator interface 220 of the work vehicle 10. In general, the operator interface 220 may correspond to any suitable input device(s) configured to allow the operator to provide operator inputs to the vehicle controller 202, such as a touch screen display, a keyboard, joystick, buttons, knobs, switches, and/or combinations thereof located within a cab of the work vehicle 10. The operator may provide various inputs into the system 200 via the operator interface 220. In one embodiment, suitable operator inputs may include, but are not limited to, a desired down force to be applied to the row unit 20, soil composition data, moisture content information, crop type, and/or any other parameter associated with or indicative of a suitable target down force to apply to the row unit 20.

Figure 5:
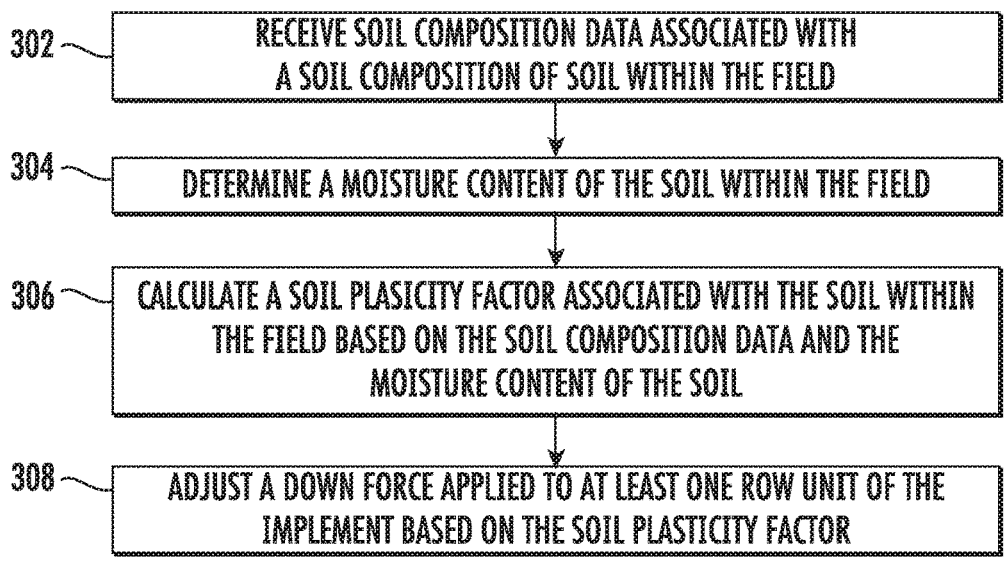
FIG. 5 illustrates a flow diagram of a method for adjusting the down force applied to row units of an implement during the performance of a planting operation within a field according to aspects of the present disclosure.

FIG. 5 illustrates a flow diagram of one embodiment of a method 300 for adjusting the down force applied to row units of an implement during the performance of a planting operation within a field in accordance with aspects of the present subject matter. Although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 300 may be described herein with reference to the implement 10 shown in FIG. 1. However, it should be appreciated that the disclosed method 300 may be used to adjust the down force applied to row units of an implement having any other suitable configuration.

At (302), the method 300 may include receiving soil composition data associated with a soil composition of soil within the field. For example, the soil composition data may include information about a proportional content of at least one constituent of the soil, such as sand, silt, clay, mineral content, or organic matter contained within the soil. In some embodiments, the method 300 may also include determining a current location of the implement within the field (e.g., using location sensor(s) 216), and receiving the soil composition data by referencing a soil composition map to determine the soil composition for the soil located relative to the current location of the implement within the field. The soil composition map may correlate the soil composition data to a plurality of locations within the field.

In other embodiments, receiving the soil composition data, at (302), may include receiving data indicative of at least one constituent of the soil within the field from a soil composition sensor 218. As indicated above, the soil composition sensor(s) 218 may include electromagnetic sensors, electrochemical sensors, mechanical sensors, optical sensors, and/or acoustic or pneumatic sensors. The system 200 may receive signals from the soil composition sensor(s) 218, and, based on the received signals, calculate the proportional content of at least one constituent of the soil within the field. For example, in some embodiments, the system 200 may determine the soil composition data by performing a calculation using the received soil composition data and/or reference a look-up table that correlates the received soil composition data with the soil composition.

In some embodiments, receiving the soil composition data, at (302), may include receiving an input from an operator of the implement that is indicative of the soil composition of the soil within the field. For example, the operator may input soil composition data using the operator interface 220. The soil composition data may include the proportional content of one or more soil constituents (e.g., sand, silt, clay, mineral content, organic matter, etc.).

The method 300 may include, at (304), determining a moisture content of the soil within the field. As an example, the method 300 may include actively sensing the moisture content of the soil as the implement is moved across the field. The controller 202 may receive signals from one or more moisture sensors 214 configured to sense the moisture content of the soil. The moisture sensor 214 may be configured to measure the electrical conductivity, resistivity, impedance, and/or dielectric permittivity of the soil. In some embodiments, the moisture sensor 214 may be configured to sense light e.g., (infrared or near-infra-red light) reflected by the soil after being emitted by the moisture sensor 214, or a separate device.

In some embodiments, the system 200 may be configured to determine the moisture content of the soil within the field by referencing a moisture map to determine the moisture content for the soil located relative to the current location of the implement 10 within the field. For example, the controller 202 may receive signals that are indicative of the location of the implement from the location sensor(s) 216 (e.g., GPS receiver). The controller 202 may reference a moisture map that includes the moisture content of the soil at a plurality of locations within the field.

In other embodiments, the method 300 include performing evapotranspiration and/or drainage modeling based on weather conditions (e.g., temperature, relative humidity, etc.), soil maps, topography, tillage practice, time since the last rainfall, and/or magnitude of the last rainfall, and the like to determine or estimate the moisture content of the soil within the field. In other embodiments, the moisture content may be sensed or determined by one or more remote moisture sensors, such as an array of field based sensors. Such sensors may wirelessly communicate data describing the moisture content of the soil to the controller 202 of the implement 10.

The method 300 may include, at (306), calculating a soil plasticity factor associated with the soil within the field based on the soil composition data and the moisture content of the soil. The soil plasticity factor may describe any suitable metric associated with a compaction or plasticity characteristic of soil. For example, the soil plasticity factor may include or describe an Atterberg limit or index (e.g., shrinkage limit, plastic limit, liquid limit, plasticity index, etc.) or any other suitable metric associated with the plasticity or compaction characteristics of the soil. The soil plasticity factor may be used to calculate at least one of a force plasticity limit or a target down force, for example as describe below with reference to (308).

In some embodiments, the soil plasticity factor can be determined inferentially via one or more parameters which can be correlated with soil plasticity, including, for example, the compression index (Cc), expansive potential (EP), angle of internal friction, shear resistance or strength, void ratio as a function of applied pressure, moisture tension, sticky limit (the limit at which soil is no longer sticky), cohesion limit (limit at which soil cannot be further compressed), flow index (slope of the flow curve), or any other suitable metric associated with the plasticity.

In some embodiments, the soil plasticity factor may be periodically updated during performance of the planting operation. For example, in some embodiments, the soil plasticity factor may be regularly updated based on new moisture content readings and/or soil composition data. For example, the soil plasticity factor may be repeatedly updated after a predetermined time interval has passed since the last update of the soil plasticity factor. In other embodiments, the soil plasticity factor may be updated only when a newly calculated soil plasticity factor value exceeds the current soil plasticity factor by a predetermined threshold.

In some embodiments, the soil plasticity factor may be updated based on detected changes in the composition of the soil. For example, the soil composition data may be periodically received (e.g., from one or more soil composition sensor(s) and/or by referencing a soil composition map), and the soil plasticity factor may be updated when at least one soil characteristic (e.g., a proportional content of a soil constituent) exceeds a predetermined threshold.

In some embodiments, the soil plasticity factor may be updated based on detected changes in the moisture content of the soil. The controller 202 may calculate the soil plasticity factor based on the moisture content exceeding a predetermined threshold of an initial moisture content, which may be sensed at the beginning of the agricultural operation.

In some embodiments, the soil plasticity factor may be updated based on changes in the location of the implement 10. For example, the soil plasticity factor may be updated when the implement 10 has been moved a predetermined distance from a distance associated with a previous moisture content and/or soil composition determination and/or associated with a previous change in the soil plasticity factor.

The method 300 may include, at (308), adjusting a down force applied to at least one row unit of the implement based on the soil plasticity factor. Generally, the controller 202 may be configured to adjust the down force based on a calculated error between a measured down force (e.g., based on signals received from load sensor(s) 212) and a down force target. For example, the controller 202 may be configured to employ a proportional-integral (PI) or proportional-integral-derivative (PID) control loop to adjust the down force based on the calculated error. In some embodiments, the controller 202 may be configured to decrease the applied down force when the measured down force is greater than the down force target plus a predetermined threshold, and configured to increase the applied down force when the measured down force is less than the down force target plus the predetermined threshold.

In some embodiments, the operator may input a desired down force target using the operator interface 220. The down force target may be set based on the desired down force target that the operator inputs. In other embodiments, the down force target may be calculated based on ground speed, crop type, and/or a roughness/irregularity factor describing the roughness or irregularity of the surface of the field, a weight of the row unit(s), a configuration of the row unit(s), and the like.

The down force may generally be adjusted in a manner that prevents or reduces the likelihood of soil compaction. For example, in some embodiments, the down force may be adjusted such that the down force does not exceed a down force limit. For instance, the controller 202 may be configured to reduce the down force applied to the row unit 20 when it is detected that the measured down force (e.g., as sensed by the load sensor(s) 212) exceeds the down force limit. The down force limit may be calculated based at least in part on at least one of the moisture content or the soil plasticity factor.

In some embodiments, the method may include calculating a force plasticity limit, which may be defined as the largest down force that can be applied without plastically compacting the soil. The force plasticity limit may be determined using a correlation between the compaction/plasticity characteristics of the soil and at least one of the moisture content or soil composition data. Such correlation may be empirically determined through experimentation or theoretically calculated. Example theoretically calculated correlations may include, or be based on, known relationships between soil compaction characteristics, such one of the Atterberg metrics (e.g., shrinkage limit, plastic limit, liquid limit, plasticity index, etc.) and at least one of the moisture content or the soil composition data associated with the soil.

In some embodiments, the force plasticity limit may also be calculated based in part on the contact area (or portion thereof) between the row unit and the soil. For example, the force plasticity limit may be calculated based in part on the number and/or size of the wheels/tires of the row unit 20, the air pressure of the tires of the row unit 20, the estimated total area of the contact patches between the tires of the row unit 20 and the soil, and the like.

In some embodiments, the down force limit may be equal to the force plasticity limit. In other embodiments, the down force limit may be calculated as a percentage of the force plasticity limit to incorporate a "safety margin" to prevent or reduce the likelihood of compaction. As examples, the percentage may range from 70% to 99% of the force plasticity limit, in some embodiments 75% to 95% of the force plasticity limit, and in some embodiments 80% to 90%.

In some embodiments, the percentage may be a predetermined value. In other embodiments, however, the relationship between the down force limit and the force plasticity limit (e.g., the percentage describe above) may be adjusted during performance of the agricultural operation. For example, the relationship between the down force limit and the force plasticity limit may be adjusted based on at least one operating parameter, such as the moisture content of the soil, the soil composition data, the speed of the implement, the magnitude of the down force limit, the type of crop being planted, or a roughness of the surface of the soil, etc.

In some embodiments, the method 300 may include calculating the down force target based on at least one of the moisture content or the soil plasticity factor and maintaining the applied down force within a range of the down force target. For example, the down force target may be calculated as a predetermined percentage of the down force limit described above. The predetermined range of the down force target may be calculated such that the down force does not exceed the down force limit. In some embodiments, the down force target may range from 60% to 95% of the force plasticity limit, in some embodiments 70% to 90% of the force plasticity limit, and in some embodiments 80% to 85%. In some embodiments, the down force target may be adjusted based on at least one operating parameter, such as the moisture content of the soil, the soil composition data, the speed of the implement, the magnitude of the down force limit, the type of crop being planted, or a roughness of the surface of the soil, etc.

In some embodiments, the operator may input an "aggressiveness" parameter, and one or more of the percentages (e.g., the "safety factor") may be set or adjusted based on the "aggressiveness" parameter. For example, the "aggressiveness" parameter may indicate how close the operator would like the applied down force to be to the force plasticity limit.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for adjusting the down force applied to a row unit of an implement during the performance of a planting operation within a field, the method comprising:
    receiving, by a computing device, soil composition data associated with a soil composition of soil within the field;
    determining, by the computing device, a moisture content of the soil within the field;
    calculating, by the computing device, a soil plasticity factor associated with the soil within the field based on the soil composition data and the moisture content of the soil; and
    adjusting, by the computing device, a down force applied to at least one row unit of the implement based on the soil plasticity factor.

2. The method of claim 1, wherein the soil composition data comprises information about a proportional content of at least one of sand, silt, clay, mineral content, or organic matter contained within the soil.

3. The method of claim 1, further comprising determining a current location of the implement within the field, and wherein receiving the soil composition data comprises referencing a soil composition map to determine the soil composition for the soil located relative to the current location of the implement within the field, the soil composition map correlating the soil composition data to a plurality locations within the field.

4. The method of claim 1, wherein receiving the soil composition data comprises receiving data indicative of at least one characteristic of the soil within the field from a soil composition sensor.

5. The method of claim 1, wherein receiving the soil composition data comprises receiving an input from an operator of the implement that is indicative of the soil composition of the soil within the field.

6. The method of claim 1, wherein calculating the soil plasticity factor comprises updating the soil plasticity factor based on detected changes in the moisture content of the soil.

7. The method of claim 1, wherein determining the moisture content of the soil comprises actively sensing the moisture content of the soil as the implement is moved across the field.

8. The method of claim 1, further comprising calculating a down force limit based on at least one of the moisture content or the soil plasticity factor, and wherein adjusting the down force applied to the at least one row unit comprises maintaining the down force less than the down force limit.

9. The method of claim 1, further comprising calculating a down force target based on at least one of the moisture content or the soil plasticity factor, and wherein adjusting the down force applied to the at least one row unit comprises maintaining the down force within a predetermined range of the down force target.

10. A system for adjusting a down force applied to a row unit of an implement, the system comprising:
    a load sensor configured to sense the down force applied to the row unit;
    a controller communicatively coupled to the load sensor, the controller including a processor and associated memory, the memory storing instructions that, when executed by the processor, configure the controller to:
        receive soil composition data associated with a soil composition of soil within the field;
        determine a moisture content of the soil within the field;
        calculate a soil plasticity factor associated with the soil within the field based on the soil composition data and the moisture content of the soil; and
        adjust the down force applied to the row unit based on the soil plasticity factor.

11. The system of claim 10, further comprising a location sensor communicatively coupled with the controller and configured to sense a current location of the implement within the field, and wherein the controller is further configured to:
- determine a current location of the implement within the field based on signals received from the location sensor; and
- reference a soil composition map to determine the soil composition for the soil located relative to the current location of the implement within the field, the soil composition map correlating the soil composition data to a plurality locations within the field.

12. The system of claim 10, further comprising a soil composition sensor communicatively coupled with the controller, and wherein the controller is further configured to receive data indicative of at least one characteristic of the soil within the field from the soil composition sensor to receive the soil composition data.

13. The system of claim 10, further comprising an operator interface communicatively coupled with the controller, and wherein the controller is further configured to receive an input from an operator of the implement via the operator interface that is indicative of a characteristic of the soil.

14. The system of claim 10, wherein the controller is further configured to update the soil plasticity factor based on detected changes in the moisture content of the soil.

15. The system of claim 10, further comprising a moisture sensor communicatively coupled with the controller, and wherein the controller is further configured to receive signals from the moisture sensor as the implement is moved across the field to determine the moisture content of the soil within the field.

16. The system of claim 10, wherein the controller is further configured to:
- calculate a down force limit based on at least one of the moisture content or the soil plasticity factor; and
- maintain the down force at a down force value that is less than the down force limit.

17. The system of claim 10, wherein the controller is further configured to:
- calculate a down force target based on at least one of the moisture content or the soil plasticity factor; and
- maintain the down force within a predetermined range of the down force target.

18. The system of claim 10, wherein the soil composition data comprises information about a proportional content of at least one of sand, silt, clay, or organic matter contained within the soil.

19. The system of claim 10, further comprising an actuator configured to adjust the down force applied to the row unit and a control valve fluidly coupled with the actuator, and wherein the controller is further configured to control the flow of a fluid to the actuator using the control valve to adjust the down force applied to the row unit.

* * * * *